US010056955B2

(12) United States Patent
Liu et al.

(10) Patent No.: US 10,056,955 B2
(45) Date of Patent: Aug. 21, 2018

(54) RESOURCE ALLOCATION METHOD AND APPARATUS

(71) Applicant: HUAWEI TECHNOLOGIES CO., LTD., Shenzhen, Guangdong (CN)

(72) Inventors: Yong Liu, Shanghai (CN); Dageng Chen, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/363,674

(22) Filed: Nov. 29, 2016

(65) Prior Publication Data

US 2017/0078006 A1 Mar. 16, 2017

Related U.S. Application Data

(63) Continuation of application No. PCT/CN2014/079763, filed on Jun. 12, 2014.

(51) Int. Cl.
*H04B 7/02* (2018.01)
*H04B 7/0456* (2017.01)
(Continued)

(52) U.S. Cl.
CPC ......... *H04B 7/0456* (2013.01); *H04L 5/0051* (2013.01); *H04L 27/2613* (2013.01); *H04W 72/042* (2013.01); *H04L 5/0026* (2013.01)

(58) Field of Classification Search
CPC ..... H04L 1/0618; H04L 1/06; H04L 25/0204; H04L 27/2647; H04L 5/0007;
(Continued)

(56) References Cited

U.S. PATENT DOCUMENTS

2011/0201376 A1 8/2011 Hu et al.
2012/0002746 A1 1/2012 Pham
(Continued)

FOREIGN PATENT DOCUMENTS

CN 102843325 A 12/2012
CN 102857458 A 1/2013
(Continued)

OTHER PUBLICATIONS

Agarwal, Ankit Ashok, "Pilot Based Channel Estimation for 3GPP LTE Downlink", Presented to the Faculty of the Graduate School of The University of Texas at Arlington in Partial Fulfillment of the Requirements for the Degree of Master of Science in Electrical Engineering, Dec. 2011, 65 Pages, The University of Texas at Arlington.

(Continued)

*Primary Examiner* — Zewdu Kassa
(74) *Attorney, Agent, or Firm* — Womble Bond Dickinson (US) LLP (57) ABSTRACT

Embodiments of the present invention provide a resource allocation method and apparatus, and relate to the communications field. On the premise of existing DMRS pilot overheads, an orthogonal DMRS design method for up to 24 data streams is implemented by means of new port mapping. The solution includes: determining, according to network configuration information, that a quantity of demodulation reference signal DMRS layers of a base station is N; and if $8 < N \leq 12$, mapping N DMRS ports corresponding to the quantity of DMRS layers onto three CDM groups on a resource block RB; if $12 < N \leq 24$, mapping N DMRS ports corresponding to the quantity of DMRS layers onto six CDM groups on an RB; or if $N \leq 8$, mapping N DMRS ports corresponding to the quantity of DMRS layers onto two CDM groups on an RB.

9 Claims, 7 Drawing Sheets (51) Int. Cl.
*H04W 72/04* (2009.01)
*H04L 27/26* (2006.01)
*H04L 5/00* (2006.01)

(58) Field of Classification Search
CPC ............. H04L 27/2657; H04L 27/2662; H04L 5/0048; H04L 25/4902; H04L 1/0009; H04L 1/0041; H04L 25/49; H04B 7/0417; H04B 7/0669; H04B 3/54
USPC ................ 375/267, 206, 259, 295, 316, 219
See application file for complete search history.

(56) References Cited

U.S. PATENT DOCUMENTS

| | | |
|---|---|---|
| 2012/0201187 A1 | 8/2012 | Koo et al. |
| 2012/0230290 A1* | 9/2012 | Seo ..................... H04L 1/0026 370/329 |
| 2012/0287966 A1 | 11/2012 | Wang et al. |
| 2012/0300670 A1 | 11/2012 | Sun et al. |
| 2014/0169322 A1* | 6/2014 | Ouchi ................. H04W 52/146 370/329 |
| 2015/0049830 A1 | 2/2015 | Hu et al. |

FOREIGN PATENT DOCUMENTS

| | | |
|---|---|---|
| CN | 102857459 A | 1/2013 |
| EP | 2464076 A2 | 6/2012 |
| EP | 3148145 A1 | 3/2017 |
| JP | 2012521102 A | 9/2012 |
| JP | 2013516858 A | 5/2013 |
| JP | 2013517642 A | 5/2013 |
| RU | 2012136144 A | 3/2014 |
| WO | 2011100857 A9 | 8/2011 |
| WO | 2014038865 A1 | 3/2014 |

OTHER PUBLICATIONS

Extended European Search Report dated May 15, 2017 for PCT/CN2014/079763.

LTE, "The UMTS Long Term Evolution from Theory to Practice", 2011, 794 Pages, Second Edition, 2011 John Wiley & Sons Ltd., Chichester West Sussex United Kingdom.

* cited by examiner

RESOURCE ALLOCATION METHOD AND APPARATUS

CROSS-REFERENCE TO RELATED APPLICATIONS

This application is a continuation of International Application No. PCT/CN2014/079763, filed on Jun. 12, 2014, the disclosure of which is hereby incorporated by reference in its entirety.

TECHNICAL FIELD

Embodiments of present invention relate to the communications field, and in particular, to a resource allocation method and apparatus.

BACKGROUND

With the rapid development of communications technologies, a high speed, a large capacity, and wide coverage have become main features of a modern communications system. A MIMO (multi-input multi-output) technology, by using resources in a spatial dimension, allows a signal to obtain an array gain, a multiplexing gain, a diversity gain, and an interference cancellation gain in space, so that a capacity and spectral efficiency of the communications system are exponentially increased. An LTE (Long Term Evolution) system can support, at a transmit end and a receive end, transmission of data streams at up to eight layers by using a multiple-antenna system. However, the modern communications system will face challenges of a larger capacity, wider coverage, and a higher rate, and the receive end and the transmit end have a larger quantity of antennas, that is, a high dimensional MIMO (High Dimensional MIMO, HD-MIMO) system will be a key technology for resolving the problem. However, in an HD-MIMO scenario and a high-order (SU-HD-MIMO) communications system, when a quantity of antenna dimensions is extremely high, DMRSs (demodulation reference signals) at eight layers corresponding to data streams at eight layers are far from enough. Because of a limit of an antenna scale, an antenna scale (8T8R) involved in an existing standard and a patent, and a corresponding DMRS design scheme all support data transmission of less than eight streams. For example, on a resource block (RB), mutually orthogonal DMRS signals at a maximum of eight layers are multiplexed. A DMRS signal is used to demodulate a PDSCH (physical downlink shared channel), and the DMRS signal is generally used to support a beamforming technology and a precoding technology. Therefore, the DMRS signal is only transmitted on a scheduled resource block, and a quantity of transmitted DMRS signals is related to a quantity of data streams (sometimes also called a quantity of layers), and the transmitted DMRS signals are in a one-to-one correspondence with antenna ports. Compared with an 8T8R MIMO system, the high dimensional MIMO system more easily enables a system to implement high-rank (Rank>8) data transmission, and further improve a throughput of an SU-MIMO system.

In conclusion, it is necessary to put forward a new resource allocation method and apparatus. That is, on the premise of existing DMRS pilot overheads, an orthogonal DMRS design method for up to 24 data streams is implemented by means of new port mapping.

SUMMARY

Embodiments of the present invention provide a resource allocation method and apparatus. On the premise of existing DMRS pilot overheads, an orthogonal DMRS design method for up to 24 data streams is implemented by means of new port mapping.

To achieve the foregoing objective, the embodiments of the present invention use the following technical solutions:

According to a first aspect, an embodiment of the present invention provides a base station, including:
- a configuration unit, configured to determine, according to network configuration information, that a quantity of DMRS layers of user equipment (UE) is N, where N is a positive integer less than or equal to 24; and
- a processing unit, configured to: if $8<N\leq12$, map N DMRS ports corresponding to the quantity of DMRS layers onto three code division multiplexing (CDM) groups on an RB, where the RB is one of RBs of a PDSCH; or if $12<N\leq24$, map N DMRS ports corresponding to the quantity of DMRS layers onto six CDM groups on an RB; or if $N\leq8$, map N DMRS ports corresponding to the quantity of DMRS layers onto two CDM groups on an RB.

In a first possible implementation manner of the first aspect,
- the processing unit is specifically configured to separately map the N DMRS ports on the RB to K symbols corresponding to the ports in a time domain; and separately map the N DMRS ports on the RB to J subcarriers corresponding to the ports in a frequency domain, $1\leq K\leq 4$, and $1\leq J\leq 6$; where
- the RB includes 12 subcarriers in the frequency domain and 14 symbols in the time domain, and the J subcarriers are the first subcarrier, the second subcarrier, the sixth subcarrier, the seventh subcarrier, the eleventh subcarrier, and the twelfth subcarrier in the 12 subcarriers; and
- if $8<N\leq12$, the first subcarrier and the seventh subcarrier are one CDM group, the second subcarrier and the eleventh subcarrier are one CDM group, and the sixth subcarrier and the twelfth subcarrier are one CDM group;
- if $12<N\leq24$, the first subcarrier is one CDM group, the seventh subcarrier is one CDM group, the second subcarrier is one CDM group, the eleventh subcarrier is one CDM group, the sixth subcarrier is one CDM group, and the twelfth subcarrier is one CDM group; or
- if $N\leq8$, the first subcarrier, the sixth subcarrier, and the eleventh subcarrier are one CDM group, and the second subcarrier, the seventh subcarrier, and the twelfth subcarrier are one CDM group.

With reference to the first aspect and the first possible implementation manner of the first aspect, in a second possible implementation manner of the first aspect, the base station further includes:
- a multiplexing unit, configured to perform code division multiplexing (CDM) on the K symbols of the RB in the time domain; and perform frequency division multiplexing (FDM) on the J subcarriers of the RB in the frequency domain.

With reference to the second possible implementation manner of the first aspect, in a third possible implementation manner of the first aspect, the base station further includes:
- a precoding unit, configured to perform a precoding operation on the PDSCH channel to generate a DMRS signal.

According to a second aspect, an embodiment of the present invention provides a resource allocation method, including:

determining, according to network configuration information, that a quantity of DMRS layers of UE is N, where N is a positive integer less than or equal to 24; and if 8<N≤12, mapping N DMRS ports corresponding to the quantity of DMRS layers onto three CDM groups on an RB; or if 12<N≤24, mapping N DMRS ports corresponding to the quantity of DMRS layers onto six CDM groups on an RB; or if N≤8, mapping N DMRS ports corresponding to the quantity of DMRS layers onto two CDM groups on an RB, where the RB is one of RBs of a PDSCH.

In a first possible implementation manner of the second aspect, the method for mapping the N DMRS ports onto the three CDM groups/the two CDM groups/the six CDM groups includes:

separately mapping the N DMRS ports on the RB to K symbols corresponding to the ports in a time domain; and separately mapping the N DMRS ports on the RB to J subcarriers corresponding to the ports in a frequency domain, 1≤K≤4, and 1≤J≤6; where the RB includes 12 subcarriers in the frequency domain and 14 symbols in the time domain, and the J subcarriers are the first subcarrier, the second subcarrier, the sixth subcarrier, the seventh subcarrier, the eleventh subcarrier, and the twelfth subcarrier in the 12 subcarriers; and if 8<N≤12, the first subcarrier and the seventh subcarrier are one CDM group, the second subcarrier and the eleventh subcarrier are one CDM group, and the sixth subcarrier and the twelfth subcarrier are one CDM group;

if 12<N≤24, the first subcarrier is one CDM group, the seventh subcarrier is one CDM group, the second subcarrier is one CDM group, the eleventh subcarrier is one CDM group, the sixth subcarrier is one CDM group, and the twelfth subcarrier is one CDM group; or if N≤8, the first subcarrier, the sixth subcarrier, and the eleventh subcarrier are one CDM group, and the second subcarrier, the seventh subcarrier, and the twelfth subcarrier are one CDM group.

With reference to the second aspect and the first possible implementation manner of the second aspect, in a second possible implementation manner of the second aspect, after the mapping the N DMRS ports onto the three CDM groups/the two CDM groups/the six CDM groups, the method further includes:

performing CDM on the K symbols of the RB in the time domain; and performing 1-DM on the J subcarriers of the RB in the frequency domain.

With reference to the second possible implementation manner of the second aspect, in a third possible implementation manner of the second aspect, after the performing FDM on the J subcarriers of the RB, the method further includes:

performing a precoding operation on the PDSCH channel to generate a DMRS signal.

The embodiments of the present invention provide a resource allocation method and apparatus. On the premise of existing DMRS pilot overheads, by setting port grouping, DMRS ports are mapped onto different CDM groups, so as to implement an orthogonal DMRS design method for up to 24 data streams, which allows a user to implement concurrent transmission and effective demodulation of 24 data streams when a large quantity of antennas are configured, thereby greatly improving a throughput of a MIMO system. In addition, the solution of the present invention can be compatible with a DMRS ports mapping solution for layers 1-8 in an existing standard in a phase inversion manner, so as to implement switch of any layer and a smooth low-order rollback, thereby reducing overheads and complexity of system design.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention.

In a process of demodulation by a receive end in a communications system, because during modulation of each carrier in an OFDM (orthogonal frequency division multiplexing) system, the carrier is suppressed, reference signals are needed during coherent demodulation by the receive end. The reference signal is also called a pilot signal or a reference signal (RS). On OFDM symbols, the reference signals are distributed in different resource elements in two-dimensional space, that is, time-frequency space, and have known amplitudes and phases. Likewise, in a MIMO system, each transmit antenna (a virtual antenna or a physical antenna) has an independent data channel. A receiver performs a channel estimation to each transmit antenna based on a known RS signal, and restores transmit data based on the channel estimation.

In an existing standard, a maximum quantity of streams supported by a quantity of layers at which DMRSs are used in a downlink is 8. Because a quantity of DMRS layers directly determines a throughput of a system in which the DMRS is located, in a higher-order SU-HD-MIMO communications system, a channel feature and potential cannot be fully used in data transmission of eight streams in most of the time (for example, in a 32T32R system, the system can multiplex 24 data streams at the same time in many scenarios; and based on such antenna configuration, a throughput of a single user may reach 10 Gbps with an MCS (modulation and coding scheme) configuration of a 64QAM+0.667 bit rate, which cannot be reached by using DMRSs at eight layers in the existing standard). With a proper channel and high-dimensional antenna configuration, to obtain a high throughput of a system, a terminal may and is necessary to perform higher-rank transmission.

In conclusion, specific DMRS signal design is needed to support HD-MIMO with a higher-order DMRS. The embodiments of the present invention provide an apparatus and a resource allocation method for a resource block, which include a new port mapping solution and a DMRS pilot pattern.

Embodiment 1

Figure 1:
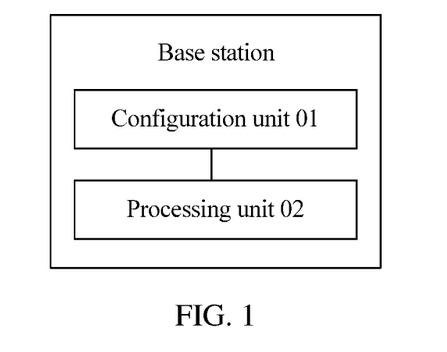
FIG. 1 is a first schematic structural diagram of a base station according to an embodiment of the present invention.

As shown in FIG. 1, this embodiment of the present invention provides a base station, including:
a configuration unit 01, configured to determine, according to network configuration information, that a quantity of demodulation reference signal DMRS layers of user equipment UE is N, where N is a positive integer less than or equal to 24; where
the network configuration information includes a quantity of receive and transmit antennas, channel information sent by the UE, and a channel estimation algorithm of the UE; and
a processing unit 02, configured to:
if $8<N\le12$, map N DMRS ports corresponding to the quantity of DMRS layers onto three code division multiplexing CDM groups on a resource block RB, where the RB is one of RBs of a physical downlink shared channel PDSCH; or if $12<N\le24$, map N DMRS ports corresponding to the quantity of DMRS layers onto six CDM groups on an RB; or if $N\le8$, map N DMRS ports corresponding to the quantity of DMRS layers onto two CDM groups on an RB.

Further, the processing unit 02, specifically configured to:
separately map the N DMRS ports on the RB to K symbols corresponding to the ports in a time domain; and
separately map the N DMRS ports on the RB to J subcarriers corresponding to the ports in a frequency domain, where $1\le K\le4$, and $1\le J\le6$.

The RB includes 12 subcarriers in the frequency domain and 14 symbols in the time domain. The J subcarriers are the first subcarrier, the second subcarrier, the sixth subcarrier, the seventh subcarrier, the eleventh subcarrier, and the twelfth subcarrier in the 12 subcarriers.

If $8<N\le12$, the first subcarrier and the seventh subcarrier are one CDM group, the second subcarrier and the eleventh subcarrier are one CDM group, and the sixth subcarrier and the twelfth subcarrier are one CDM group.

If $12<N\le24$, the first subcarrier is one CDM group, the seventh subcarrier is one CDM group, the second subcarrier is one CDM group, the eleventh subcarrier is one CDM group, the sixth subcarrier is one CDM group, and the twelfth subcarrier is one CDM group.

If $N\le8$, the first subcarrier, the sixth subcarrier, and the eleventh subcarrier are one CDM group, and the second subcarrier, the seventh subcarrier, and the twelfth subcarrier are one CDM group.

Figure 2:
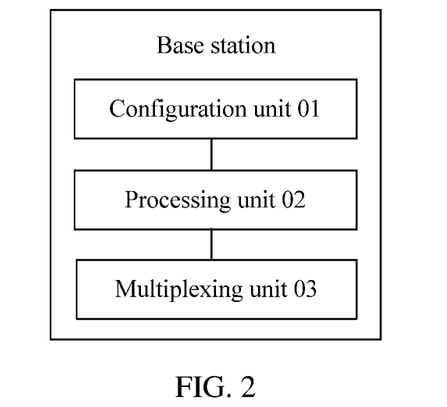
FIG. 2 is a second schematic structural diagram of a base station according to an embodiment of the present invention.

Further, as shown in FIG. 2, the base station further includes:
a multiplexing unit 03, configured to perform CDM on the K symbols of the RB in the time domain; and perform FDM on the J subcarriers of the RB in the frequency domain.

Figure 3:
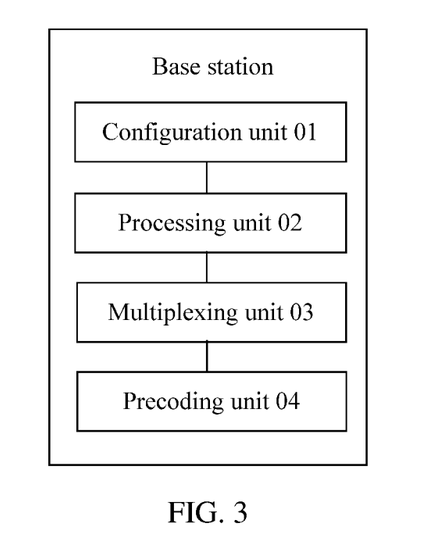
FIG. 3 is a third schematic structural diagram of a base station according to an embodiment of the present invention.

Further, as shown in FIG. 3, the base station further includes:
a precoding unit 04, configured to perform a precoding operation on the PDSCH channel to generate a DMRS signal.

The base station provided in this embodiment of the present invention determines, according to network configuration information, that a quantity of DMRS layers of the base station is N; and if $8<N\le12$, maps N DMRS ports corresponding to the quantity of DMRS layers onto three CDM groups on a resource block RB; if $12<N\le24$, maps N DMRS ports corresponding to the quantity of DMRS layers onto six CDM groups on an RB; or if $N\le8$, maps N DMRS ports corresponding to the quantity of DMRS layers onto two CDM groups on an RB. On the premise of existing DMRS pilot overheads, according to the solution, an orthogonal DMRS design method for up to 24 data streams is implemented by means of new port mapping, which allows a user to implement concurrent transmission and effective demodulation of 24 data streams when a large quantity of antennas are configured, thereby greatly improving a throughput of a MIMO system. In addition, the solution represented by embodiments of the present invention can be compatible with a DMRS mapping solution for Ranks 1-8 in an existing standard in a phase inversion manner, so as to implement switch of any layer and a smooth low-order rollback, thereby reducing overheads and complexity of system design.

Embodiment 2

Figure 4:
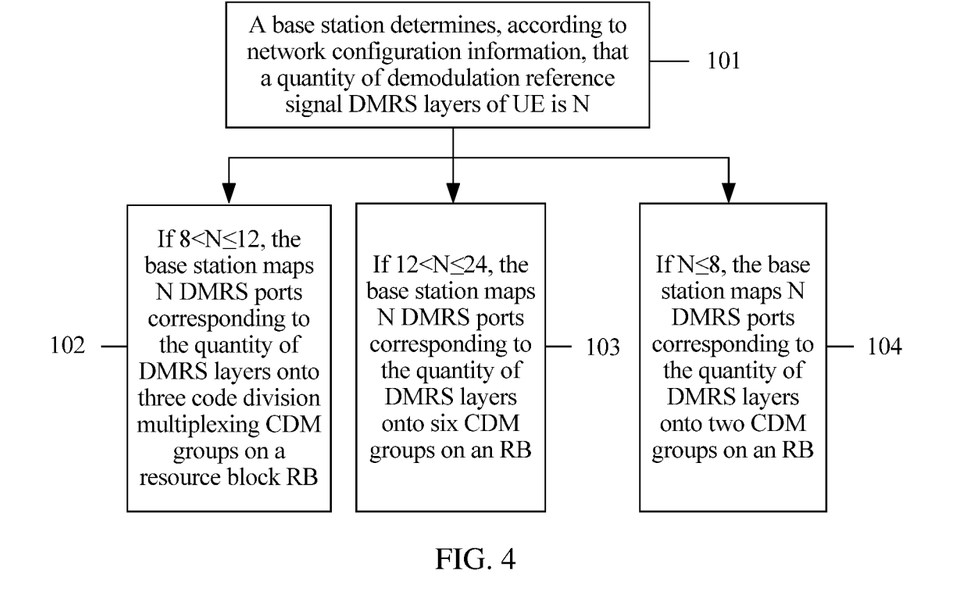
FIG. 4 is a first schematic flowchart of a resource allocation method according to an embodiment of the present invention.

As shown in FIG. 4, this embodiment of the present invention provides a resource allocation method, including:
101. A base station determines, according to network configuration information, that a quantity of demodulation reference signal DMRS layers of UE is N.

N is a positive integer less than or equal to 24, and the network configuration information includes a quantity of receive and transmit antennas, channel information sent by the UE, and a channel estimation algorithm of the UE.

Because of a limit of an antenna scale, an antenna scale (8T8R) involved in an existing standard and a patent, and a corresponding DMRS design scheme all support data transmission of less than eight streams. For example, on a resource block, mutually orthogonal DMRS signals at a maximum of eight layers are multiplexed. However, as an important evolution direction of 5G, a high dimensional MIMO system (such as 32T32R and 256T32R) may sharply increase a system capacity, which is widely believed to be a necessary solution. Therefore, when the base station determines, according to the quantity of receive and transmit antennas, the channel information sent by the UE, and the channel estimation algorithm of the UE, that more than eight data streams may be allocated to the UE. Specifically, the base station allocates a corresponding quantity of data streams to the UE according to reference values, such as the quantity of receive and transmit antennas sent by the UE, the channel information sent by the UE, and the channel estimation algorithm of the UE. Because a quantity of data streams is corresponding to the quantity of DMRS layers, the base station further determines that the quantity of demodulation reference signal DMRS layers of the UE is N, and N≤24, so as to implement concurrent transmission and effective demodulation of 24 data streams or less than 24 data streams, thereby improving a throughput of a MIMO system.

102. If 8<N≤12, the base station maps N DMRS ports corresponding to the quantity of DMRS layers onto three CDM groups on a resource block RB.

103. If 12<N≤24, the base station maps N DMRS ports corresponding to the quantity of DMRS layers onto six CDM groups on an RB.

104. If N≤8, the base station maps N DMRS ports corresponding to the quantity of DMRS layers onto two CDM groups on an RB.

The RB is one of RBs of a PDSCH, and each RB includes 168 resource elements REs formed by 12 subcarriers in a frequency domain and 14 symbols in a time domain.

This embodiment of the present invention provides a method for performing resource allocation on an RB, which is a port mapping solution that may support DMRSs at up to 24 layers. The solution includes three cases: If 8<N (a quantity of DMRS layers)≤12, the base station maps N DMRS ports corresponding to the quantity of DMRS layers onto three CDM groups on an RB; if 12<N≤24, the base station maps N DMRS ports corresponding to the quantity of DMRS layers onto six CDM groups on an RB; or if N≤8, the base station maps N DMRS ports corresponding to the quantity of DMRS layers onto two CDM groups on an RB, thereby eventually implementing resource allocation on each RB in a PDSCH.

In step 102, if 8<N≤12, the base station separately maps the N DMRS ports on the RB to K symbols corresponding to the ports in a time domain; and separately maps the N DMRS ports on the RB to J subcarriers corresponding to the ports in a frequency domain, where 1≤K≤4, and 1≤J≤6. The first subcarrier and the seventh subcarrier are one CDM group, the second subcarrier and the eleventh subcarrier are one CDM group, and the sixth subcarrier and the twelfth subcarrier are one CDM group, so that it is implemented that the base station performs CDM on the K symbols in the time domain, and performs FDM on the J subcarriers on the RB in the frequency domain. A specific method for determining a time domain position and a frequency domain position of N DMRS layers is elaborated in embodiment 3, and details are not described herein.

The CDM is a multiplexing manner in which various original signals are distinguished according to different coding schemes, and is mainly combined with various multiple access technologies to generate various access technologies, including wireless and wired access.

Figure 5:
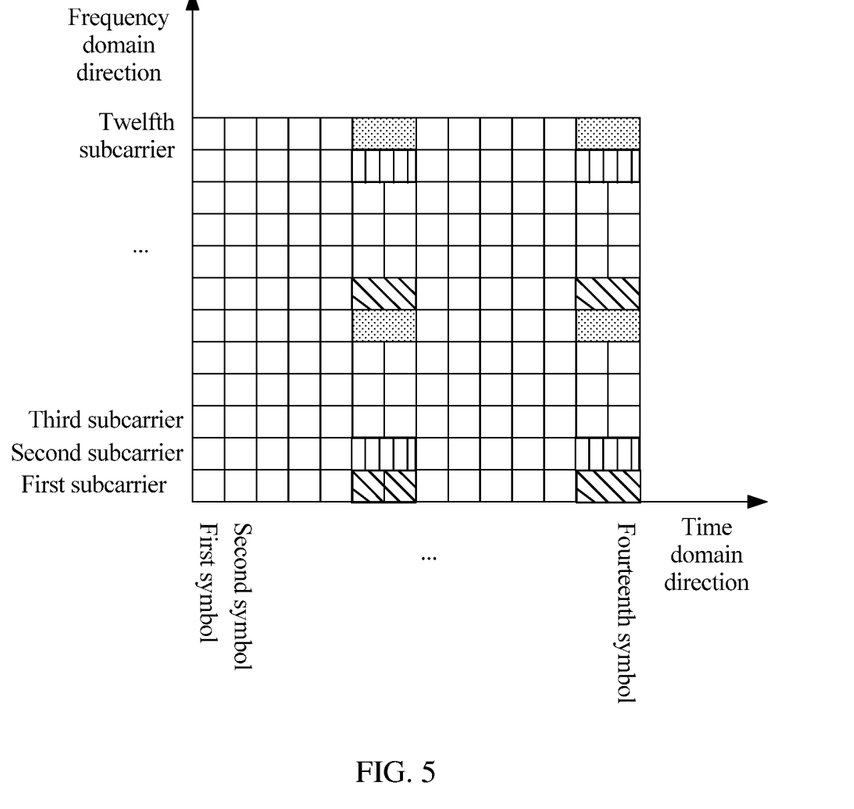
FIG. 5 is a DMRS pilot pattern obtained when 8<N≤12 according to an embodiment of the present invention.

A code division multiple access system allocates a specific address code to each user, and information is transmitted by using a common channel. In FDM, total bandwidth used for transmitting a channel is divided into several sub-bands (or called sub-channels), and each sub-channel transmits one signal. The frequency division multiplexing requires that a total frequency width is greater than the sum of all sub-channel frequencies, and in order to ensure that signals transmitted on the sub-channels are not interfered with each other, an isolation belt should be set between the sub-channels, so as to ensure that signals are not interfered with each other (one of conditions). A feature of the frequency division multiplexing technology is that the signals transmitted on all the sub-channels work in a parallel manner, and a transmission delay may not be considered during transmission of each signal. Therefore, the frequency division multiplexing technology gains very wide application. Exemplarily, as shown in FIG. 5, if each RB includes the first to the twelfth subcarriers in the frequency domain, and includes the first to the fourteenth symbols in the time domain, the base station divides the N DMRS layers into three groups. The first and the seventh subcarriers form the first CDM group, the second and the eleventh subcarriers form the second CDM group, and the sixth and the twelfth subcarriers form the third CDM group. In the time domain, the base station separately allocates a scrambling code with a corresponding length for the first CDM group, the second CDM group, and the third CDM group, so as to implement CDM-based DMRS multiplexing on the sixth symbol, the seventh symbol, the thirteenth symbol, and the fourteenth symbol; and in the frequency domain, the base station performs frequency division multiplexing FDM on the three CDM groups on which CDM-based DMRS multiplexing is implemented.

In step 103, if 12<N≤24, the base station separately maps the N DMRS ports on the RB to the K symbols corresponding to the ports in the time domain; and separately maps the N DMRS ports on the RB to the J subcarriers corresponding to the ports in the frequency domain, where 1≤K≤4, and 1≤J≤6. The first subcarrier is one CDM group, the seventh subcarrier is one CDM group, the second subcarrier is one CDM group, the eleventh subcarrier is one CDM group, the sixth subcarrier is one CDM group, and the twelfth subcarrier is one CDM group.

Figure 6:
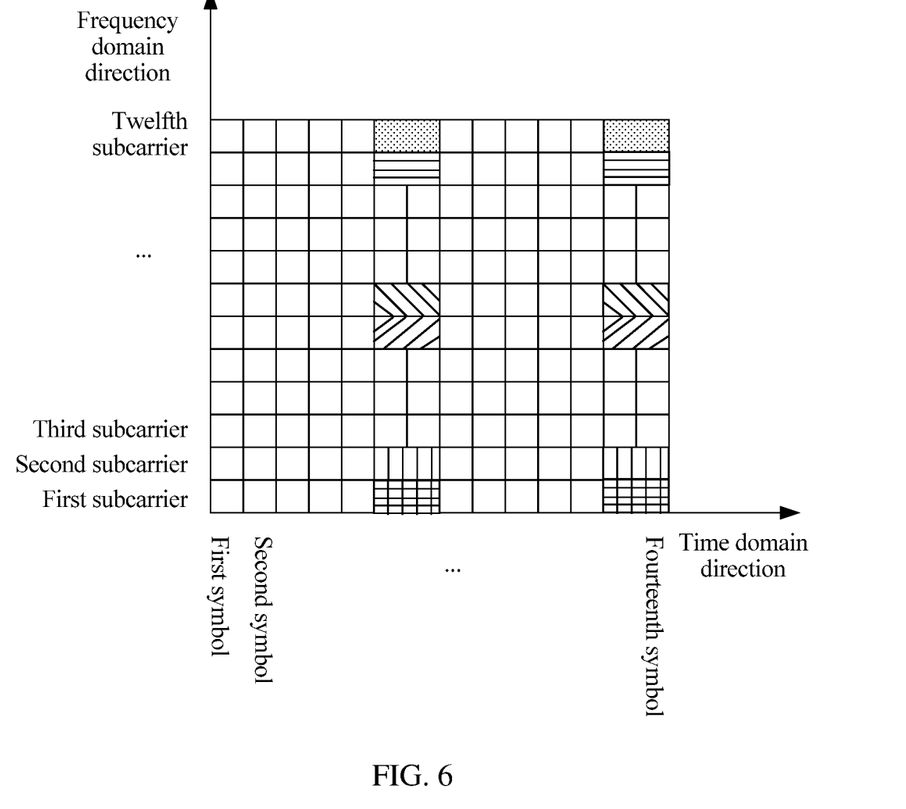
FIG. 6 is a DMRS pilot pattern obtained when 12<N≤24 according to an embodiment of the present invention.

Exemplarily, as shown in FIG. 6, if each RB includes the first to the twelfth subcarriers in the frequency domain, and includes the first to the fourteenth symbols in the time domain, the base station divides the N DMRS layers into six groups. The first subcarrier is the fourth CDM group, the second subcarrier is the fifth CDM group, the sixth subcarrier is the sixth CDM group, the seventh subcarrier is the seventh CDM group, the eleventh subcarrier is the eighth CDM group, and the twelfth subcarrier is the ninth CDM group. In the time domain, the base station separately allocates a scrambling code with a corresponding length to the fourth CDM group, the fifth CDM group, the sixth CDM group, the seventh CDM group, the eighth CDM group, and the ninth CDM group, so as to implement CDM-based DMRS multiplexing on the sixth symbol, the seventh symbol, the thirteenth symbol, and the fourteenth symbol; and in the frequency domain, the base station performs frequency division multiplexing FDM on the six CDM groups on which CDM-based DMRS multiplexing is implemented.

In step 104, if N≤8, the base station separately maps the N DMRS ports on the RB to the K symbols corresponding to the ports in the time domain; and separately maps the N DMRS ports on the RB to the J subcarriers corresponding to the ports in the frequency domain, where 1≤K≤4, and 1≤J≤6. The first subcarrier, the sixth subcarrier, and the eleventh subcarrier are one CDM group, and the second subcarrier, the seventh subcarrier, and the twelfth subcarrier are one CDM group.

Figure 7:
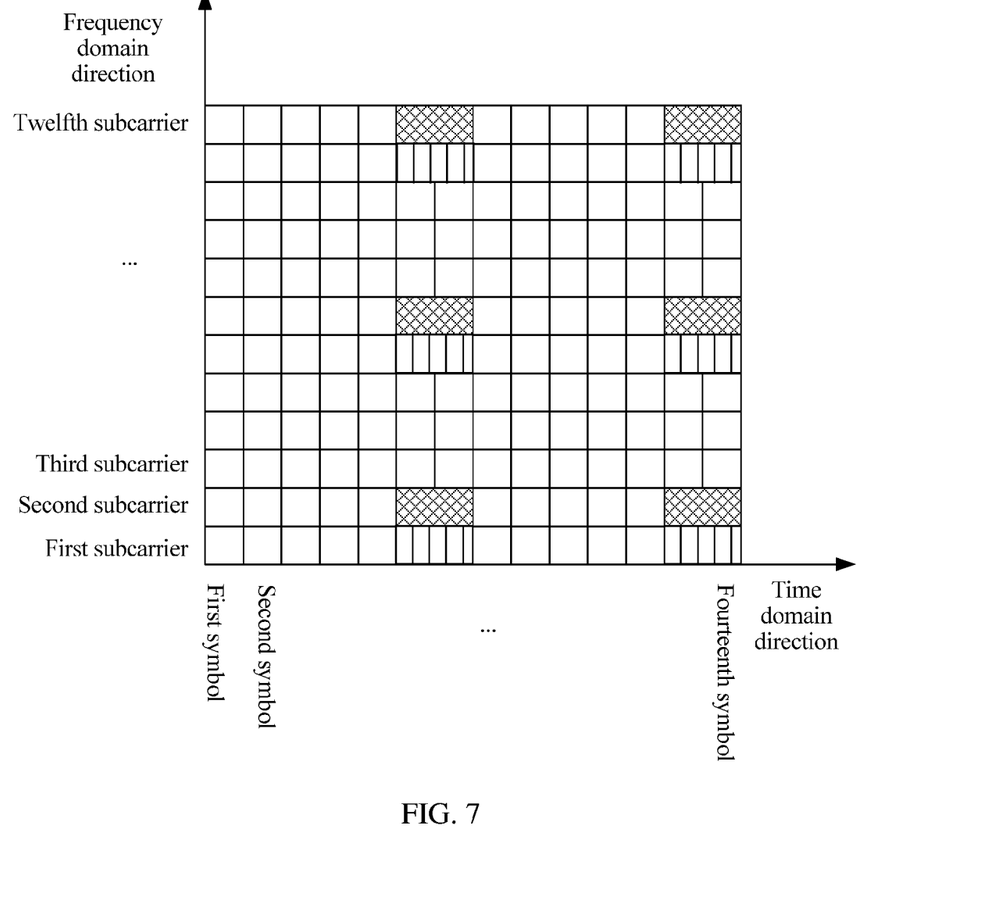
FIG. 7 is a DMRS pilot pattern obtained when N≤8 according to an embodiment of the present invention.

Exemplarily, as shown in FIG. 7, if each RB includes the first to the twelfth subcarriers in the frequency domain, and includes the first to the fourteenth symbols in the time domain, the base station divides the N DMRS layers into two groups. The first, the sixth, and the eleventh subcarriers form the tenth CDM group, the second, the seventh, and the twelfth subcarriers form the eleventh CDM group. In the time domain, the base station separately allocates a scrambling code with a corresponding length to the tenth CDM group, and the eleventh CDM group, so as to implement CDM-based DMRS multiplexing on the sixth symbol, the seventh symbol, the thirteenth symbol, and the fourteenth symbol; and in the frequency domain, the base station performs frequency division multiplexing FDM on the two CDM groups on which CDM-based DMRS multiplexing is implemented.

Obviously, steps 102 to 104 are three different cases exist after step 101 is performed. Therefore, there is no logical sequence between steps 102 to 104.

So far, this embodiment of the present invention provides a high-order DMRS port mapping method. Compared with the prior art, on the premise of existing DMRS pilot overheads, according to the solution, an orthogonal DMRS design method for up to 24 data streams is implemented by means of new port mapping, which allows a user to implement concurrent transmission and effective demodulation of 24 data streams when a large quantity of antennas are configured, thereby greatly improving a throughput of a MIMO system. In addition, the solution of the present invention can be compatible with a DMRS solution for Ranks 1-8 in an existing standard in a phase inversion manner, so as to implement switch of any layer and a smooth low-order rollback.

Specifically, in an existing LTE-A standard, SU-MIMO supports orthogonal DMRS multiplexing of at most eight layers, that is, the system may multiplex at most eight streams in data transmission. Specifically, when the quantity N of DMRS layers is 1 or 2 (Ranks 1-2), the DMRS signal is orthogonalized in a CDM manner, and 12 resource elements REs are occupied on each resource block RB. As shown in FIG. 6, distribution of the N DMRS layers on the RB is as follows: The N DMRS layers are distributed on the second, the seventh and the twelfth subcarriers of each RB in the frequency domain; and the N DMRS layers are distributed on the sixth, the seventh, the thirteenth and the fourteenth symbols of each subframe in the time domain. In this case, an overhead of DMRSs is 7.1%. A method for calculating the overhead of the DMRSs (overhead_DMRS) is: a quantity of resource elements REs occupied by the DMRSs on each resource block RB/a quantity of REs on each RB. In the foregoing case, the overhead of the DMRSs=12/(14*12)=7.1%.

In a case in which 3≤N≤8 (Ranks 3-8), a CDM-frequency division multiplexing FDM mixed multiplexing manner is used, and a total of 24 REs are occupied on each RB. As shown in FIG. 6, distribution of the N DMRS layers on an RB is as follows: The N DMRS layers are distributed in the first, the second, the sixth, the seventh, the eleventh and the twelfth subcarriers of each RB in the frequency domain; and the N DMRS layers are distributed in the sixth, the seventh, the thirteenth and the fourteenth symbols of each subframe in the time domain. In this case, an overhead of DMRSs is 14% (the overhead of the DMRSs=24/(14*12), where each RB has 12 (in the frequency domain)*14 (in the time domain) resource elements in total).

For a specific pilot overhead, compared with the DMRS design scheme in which Rank≤8, in the present invention, pilot density of DMRS at each layer gradually decreases with an increase of a quantity of multiplexed layers. When 1≤N≤8 (Ranks 1-8), the pilot density is 3 REs/RB; in addition, when 9≤N≤12 (Ranks 9-12), the pilot density is 2 REs/RB; and when 13≤N≤24 (Ranks 12-24), the pilot density is reduced to 1 RE/RB. In addition, according to the solution, higher-rank data transmission and demodulation are ensured; and the solution can be compatible with a DMRS port mapping solution for Ranks 1-8 in an existing standard in a phase inversion manner, so as to implement switch of any layer and a smooth low-order rollback, thereby reducing overheads and complexity of system design.

It should be noted that the DMRS pilot density described in this embodiment of the present invention is a quantity of subcarriers occupied by each CDM group. When Rank≤8, each CDM group includes three subcarriers, for example, if the first, the second, the third, and the fourth layers occupy the first, the six and eleventh subcarriers, it is considered that the DMRS pilot density is 3 REs/RB. Similarly, when 8<Rank≤12, each CDM group includes two subcarriers, and therefore, a corresponding DMRS pilot density is 2 REs/RB. When 12<N≤24, each CDM group includes one subcarrier, and therefore, a corresponding DMRS pilot density is 1 RE/RB.

According to the resource allocation method provided in this embodiment of the present invention, it is determined, according to network configuration information, that a quantity of DMRS layers of a base station is N; and if 8<N≤12, N DMRS ports corresponding to the quantity of DMRS layers are mapped onto three CDM groups on a resource block RB; if 12<N≤24, N DMRS ports corresponding to the quantity of DMRS layers are mapped onto six CDM groups on an RB; or if N≤8, N DMRS ports corresponding to the quantity of DMRS layers are mapped onto two CDM groups on an RB. On the premise of existing DMRS pilot overheads, according to the solution, an orthogonal DMRS design method for up to 24 data streams is implemented by means of new port mapping, which allows a user to implement concurrent transmission and effective demodulation of 24 data streams when a large quantity of antennas are configured, thereby greatly improving a throughput of a MIMO system. In addition, the solution of the present invention can be compatible with a DMRS mapping solution for Ranks 1-8 in an existing standard in a phase inversion manner, so as to implement switch of any layer and a smooth low-order rollback, thereby reducing overheads and complexity of system design.

Embodiment 3

Figure 8:
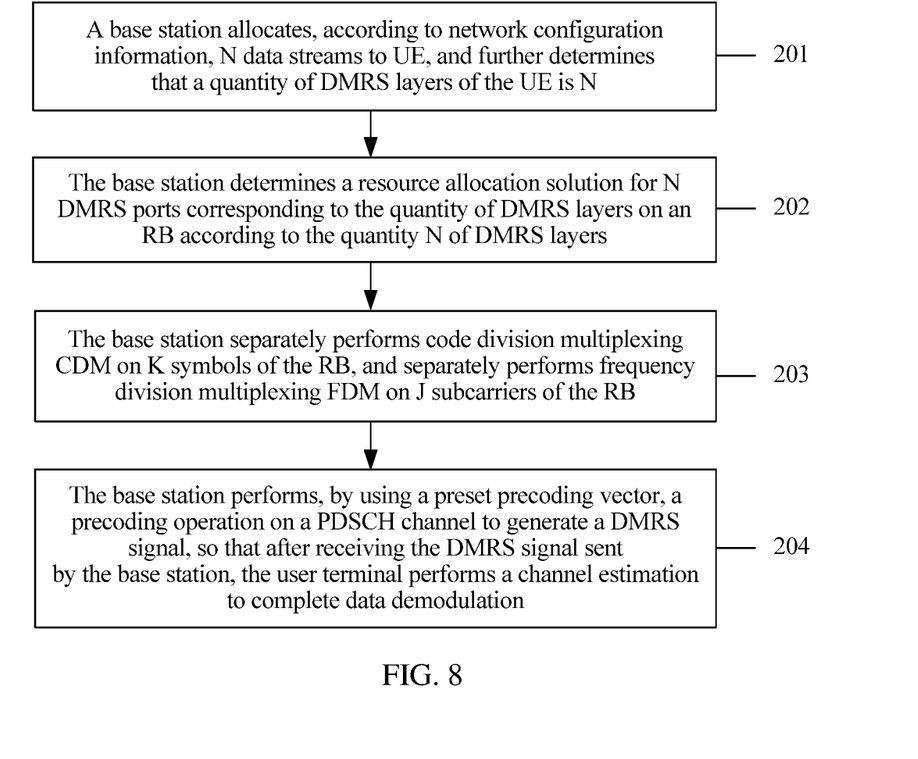
FIG. 8 is a second schematic flowchart of a resource allocation method according to an embodiment of the present invention.
Figure 9:
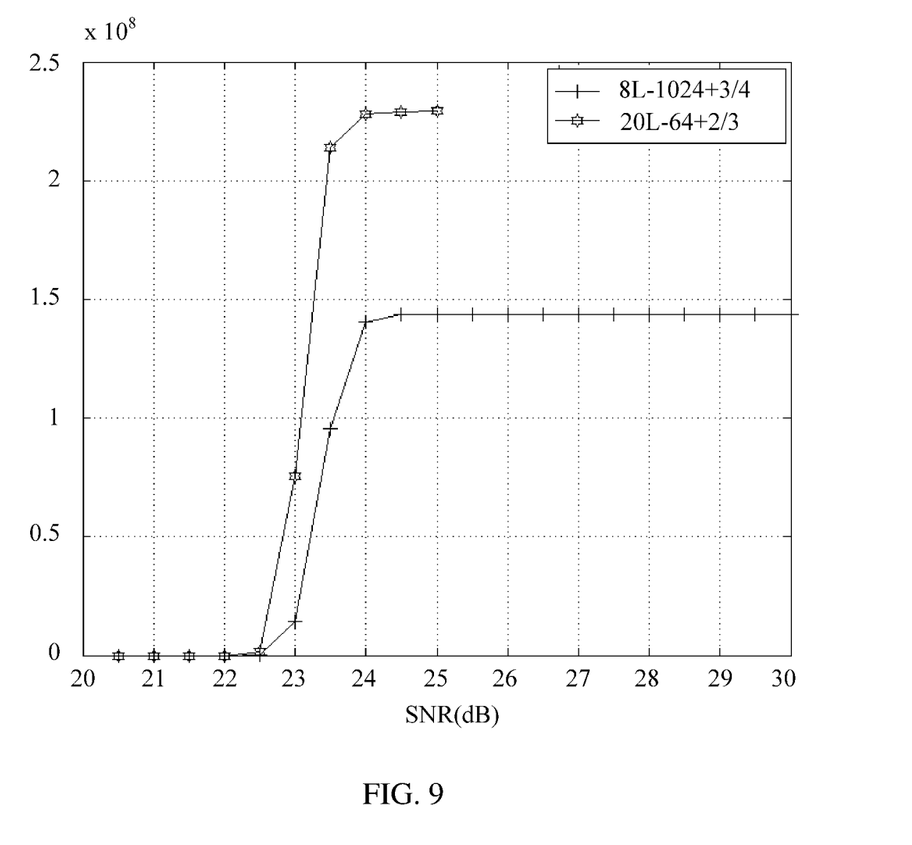
FIG. 9 is a schematic diagram of a comparison between throughputs in a resource allocation method and that in the prior art according to an embodiment of the present invention.

As shown in FIG. 8, this embodiment of the present invention provides a resource allocation method, including:

201. A base station allocates, according to network configuration information, N data streams to UE, and further determines that a quantity of DMRS layers of the UE is N.

202. The base station determines a resource allocation solution for N DMRS ports corresponding to the quantity of DMRS layers on an RB according to the quantity N of DMRS layers.

203. The base station separately performs CDM on K symbols of the RB, and separately performs FDM on J subcarriers of the RB.

204. The base station performs, by using a preset precoding vector, a precoding operation on a PDSCH channel to generate a DMRS signal, so that after receiving the DMRS signal sent by the base station, the user terminal performs a channel estimation to complete data demodulation.

In step 201, the network configuration information includes: a quantity of receive and transmit antennas, channel information sent by the UE, and a channel estimation algorithm of the UE.

Generally, the base station determines a quantity of delivered data streams according to an RI (rank indication) fed back by the UE in the network configuration information, or in a TDD (time division duplex) system, the base station calculates a quantity of ranks based on an acquired channel and the network configuration information, and delivers, based on the quantity of ranks, corresponding data streams to determine the quantity of DMRS layers of the UE.

In step 202, the DMRS resource allocation solution includes: separately mapping the N DMRS ports on the RB to the K symbols corresponding to the ports, and separately mapping the N DMRS ports on the RB to the J subcarriers corresponding to the ports in a frequency domain, where 1≤K≤4, and 1≤J≤6.

Exemplarily, on the basis of the DMRS port mapping solution, this embodiment of the present invention provides a specific DMRS pilot pattern (that is, a schematic diagram of time and frequency resource allocation of REs). It should be noted that the PDSCH channel includes several resource blocks RBs. Each RB includes 168 resource elements REs formed by 12 subcarriers in a frequency domain and 14 symbols in a time domain. A vertical coordinate is used as a frequency domain direction, and a horizontal coordinate is used as a time domain direction. It is specified that lines from the start point are respectively the first subcarrier to the twelfth subcarrier in the frequency domain direction, and columns from the start point are respectively the first symbol to the fourteenth symbol in the time domain direction.

As shown in FIG. 5, which is a corresponding DMRS pilot pattern obtained when 8<a quantity N of DMRS layers≤12.

Specifically, if 8<N (the quantity of DMRS layers)≤12, the base station divides the N DMRS layers into three CDM groups. The first and the seventh subcarriers form the first CDM group, the second and the eleventh subcarriers form the second CDM group, and the sixth and the twelfth subcarriers form the third CDM group. In the time domain, the base station separately allocates a scrambling code whose length is a corresponding quantity to the first CDM group, the second CDM group, and the third CDM group, so as to implement CDM-based DMRS multiplexing on the sixth symbol, the seventh symbol, the thirteenth symbol, and the fourteenth symbol; and in the frequency domain, the base station performs FDM on the three CDM groups on which CDM-based DMRS multiplexing is implemented, so as to ensure orthogonality of DMRSs at the layers.

As shown in FIG. 6, which is a corresponding DMRS pilot pattern obtained when 12<a quantity N of DMRS layers≤24.

Specifically, if 12<the quantity N of DMRS layers≤24, the base station divides the N DMRS layers into six CDM groups. The first subcarrier is the fourth CDM group, the second subcarrier is the fifth CDM group, the sixth subcarrier is the sixth CDM group, the seventh subcarrier is the seventh CDM group, the eleventh subcarrier is the eighth group, and the twelfth subcarrier is the ninth CDM group. In the time domain, the base station separately allocates a scrambling code whose length is a quantity of data streams in a corresponding group to the fourth CDM group, the fifth CDM group, the sixth CDM group, the seventh CDM group, the eighth CDM group, and the ninth CDM group, so as to implement CDM-based DMRS multiplexing on the sixth symbol, the seventh symbol, the thirteenth symbol, and the fourteenth symbol; and in the frequency domain, the base station performs frequency division multiplexing FDM on the six CDM groups on which CDM-based DMRS multiplexing is implemented, so as to ensure orthogonality of DMRSs at the layers.

The following gives a specific method for calculating a frequency domain position and a time domain position in resource allocation when the quantity N of DMRS layers=24.

A value of the frequency domain position is:

$$k = N_{SC}^{RB} n_{PRB} + k'$$

$N_{SC}^{RB}$ is a frequency domain scale of each RB, and is represented as a quantity of subcarriers; $n_{PRB}$ is an RB index of the PDSCH channel; k is the frequency domain position corresponding to DMRSs at the 24 layers in the entire PDSCH channel; and k' is a frequency domain position corresponding to the DMRSs at the 24 layers on each RB, and $$k' = \begin{cases} 1 & p \in \{207, 208, 219, 225\} \\ 2 & p \in \{209, 210, 220, 226\} \\ 6 & p \in \{211, 212, 221, 227\} \\ 7 & p \in \{213, 214, 222, 228\} \\ 11 & p \in \{215, 216, 223, 229\} \\ 12 & p \in \{217, 218, 224, 230\} \end{cases}$$

In the foregoing formula, 207 to 230 are port numbers preset by the base station, and 207 to 230 correspond to DMRSs at the first to the twenty-fourth layers. When a value of N is determined, port numbers corresponding to the value of N are determined. In addition, it should be noted that the port numbers preset by the base station include 207 to 230, but are not limited to 207 to 230, for example, 7 to 30 are used to indicate 24 port numbers preset by the base station.

It can be learned from the foregoing formula that, when the quantity N of DMRS layers=24 (including the 24 port numbers from 207 to 230), values of k' are 1, 2, 6, 7, 11, and 12, that is, when N=24, the frequency domain position allocated by the base station is the first, the second, the sixth, the seventh, the eleventh and the twelfth subcarriers in FIG. 6. A value of the time domain position is:

$$l = l' \bmod 2 + 5$$

$$l' = \begin{cases} 0, 1 & \text{if } n_s \bmod 2 = 0, \\ 2, 3 & \text{if } n_s \bmod 2 = 1, \end{cases}$$

$n_s$ is a timeslot index.

It can be learned from the foregoing formula that, when the quantity N of DMRS layers=24, values of l' are 6, 7, 13, and 14, that is, the sixth, the seventh, the thirteenth, and the fourteenth symbols in FIG. 6.

The base station determines, according to the port mapping solution and calculation formulas, a DMRS port mapping solution used when N=24. Then, the base station performs, according to the determined time domain position and frequency domain position, CDM multiplexing on DMRSs at four layers in the time domain by using an OCC code whose length is 4; and performs FDM multiplexing on the six groups of DMRSs on which CDM multiplexing is performed, so that a total of 24 REs are occupied on each RB to complete DMRS port mapping. As shown in FIG. 6, when N=24, a distribution of DMRSs on an RB is as follows: The DMRSs are distributed on the first, the second, the sixth, the seventh, the eleventh, and the twelfth subcarriers of each RB in the frequency domain; and the DMRSs are distributed on the sixth, the seventh, the thirteenth, and the fourteenth symbols of each subframe in the time domain. In this case, a DMRS pilot overhead is still 14%, but concurrent transmission and effective demodulation of 24 data streams are supported.

The following gives a specific method for calculating a frequency domain position and a time domain position in resource allocation when the quantity N of DMRS layers=11.

When the quantity N of DMRS layers=11, the base station needs to determine, according to the resource allocation solution, a time domain position and a frequency domain position in which ports corresponding to DMRSs at the 11 layers are located on each RB, so as to complete resource mapping of the PDSCH channel.

When the quantity N of DMRS layers=11, a value of the frequency domain position is:

$$k = N_{SC}^{RB} n_{PRB} + k'$$

$N_{SC}^{RB}$ is a frequency domain scale of each RB, and is represented as a quantity of subcarriers; $n_{PRB}$ is an RB index of the PDSCH channel; k is the frequency domain position corresponding to DMRSs at the 24 layers in the entire PDSCH channel; and k' is a frequency domain position corresponding to the DMRSs at the 24 layers on each RB, and $$k' = \begin{cases} 1, 7 & p \in \{207, 208, 213, 216\} \\ 2, 11 & p \in \{209, 210, 214, 217\} \\ 6, 12 & p \in \{211, 212, 215\} \end{cases}$$

In the foregoing formula, 207 to 215 are port numbers preset by the base station, and 207 to 215 correspond to DMRSs at the first to the eleventh layers. With reference to the foregoing formula and the formula of k' obtained when the quantity N of DMRS layers=24, it can be learned that, when the quantity N of DMRS layers is different, the formula of k' changes with the value of N. When N≤8, $$k' = \begin{cases} 1, 6, 11 & p \in \{207, 208, 211, 213\} \\ 2, 7, 12 & p \in \{209, 210, 212, 214\} \end{cases}$$

When 8<N≤12, $$k' = \begin{cases} 1, 7 & p \in \{207, 208, 213, 216\} \\ 2, 11 & p \in \{209, 210, 214, 217\} \\ 6, 12 & p \in \{211, 212, 215, 218\} \end{cases}$$

That is, the formula of k' totally has 24 cases.

It can be learned that, when the quantity N of DMRS layers=11 (including 11 port numbers from 207 to 215), values of k' are 1, 2, 6, 7, 11, and 12, that is, the first, the second, the sixth, the seventh, the eleventh, and the twelfth subcarriers in FIG. 5.

When the quantity N of DMRS layers=11, a value of the time domain position is:

$$l = l' \bmod 2 + 5$$

$$l' = \begin{cases} 0, 1 & \text{if } n_s \bmod 2 = 0, \\ 2, 3 & \text{if } n_s \bmod 2 = 1, \end{cases}$$

where $n_s$ is a timeslot index.

It can be learned from the foregoing formula that, when the quantity N of DMRS layers=11, in FIG. 2, the sixth, the seventh, the thirteenth, and the fourteenth symbols on the first and the seventh subcarriers, the sixth, the seventh, the thirteenth, and the fourteenth symbols on the second and the eleventh subcarriers, and the sixth, the seventh, and the thirteenth symbols on the sixth and the twelfth subcarriers are multiplexed.

As shown in FIG. 7, which is a corresponding DMRS pilot pattern obtained when a quantity N of DMRS layers≤8.

Specifically, if the quantity N of DMRS layers≤8, the base station divides the N DMRS layers into two groups. The first, the six, and the eleventh subcarriers form the tenth CDM group, and the second, the seventh, and the twelfth subcarriers form the eleventh CDM group. In the time domain, the base station separately allocates a scrambling code whose length is a corresponding quantity to the tenth CDM group and the eleventh CDM group, so as to implement CDM-based DMRS multiplexing on the sixth symbol, the seventh symbol, the thirteenth symbol, and the fourteenth symbol; and in the frequency domain, the base station performs frequency division multiplexing FDM on the two CDM groups on which CDM-based DMRS multiplexing is implemented. The resource allocation solution, provided in this embodiment of the present invention, used when the quantity N of DMRS layers≤8 is consistent with the prior art. That is, the design scheme proposed in the present invention not only implements higher-order DMRS multiplexing, and higher-order data transmission and demodulation, but can also be compatible with a DMRS port mapping solution for Ranks 1-8 in an existing standard in a phase inversion manner, so as to implement switch of any layer and a smooth low-order rollback, thereby reducing overheads and complexity of system design.

So far, according to the resource allocation solution provided in this embodiment of the present invention, DMRS port mapping corresponding to each RB is completed for three cases in which a quantity N of DMRS layers≤8, 12<N≤24, and 8<N≤12, so as to complete resource mapping of a PDSCH channel.

In step 204, the base station performs, by using a precoding vector, a precoding operation on the PDSCH channel on which resource mapping is performed, to generate a DMRS signal, so that after receiving the DMRS signal sent by the base station, the user terminal performs a channel estimation to complete data demodulation. Herein, a manner of generating the precoding vector includes but is not limited to singular value decomposition SVD or discrete Fourier transform DFT.

So far, the embodiments of the present invention provide a high-order DMRS resource allocation method. As shown in FIG. 7, a horizontal coordinate is a signal-to-noise ratio/dB, and a vertical coordinate is a throughput/bps. That quantities of DMRS layers are respectively 8 and 20 is used as an example. Compared with an existing DMRS port mapping method (port mapping for DMRSs at eight layers), the design scheme (port mapping for DMRSs at 20 layers) proposed in the present invention can enable high-order antenna single-user MIMO to obtain a higher throughput.

According to the resource allocation method provided in this embodiment of the present invention, it is determined, according to network configuration information, that a quantity of DMRS layers of a base station is N; and if 8<N≤12, N DMRS ports corresponding to the quantity of DMRS layers are mapped onto three CDM groups on a resource block RB; if 12<N≤24, N DMRS ports corresponding to the quantity of DMRS layers are mapped onto six CDM groups on an RB; or if N≤8, N DMRS ports corresponding to the quantity of DMRS layers are mapped onto two CDM groups on an RB. On the premise of existing DMRS pilot overheads, according to the solution, an orthogonal DMRS design method for up to 24 data streams is implemented by means of new port mapping, which allows a user to implement concurrent transmission and effective demodulation of 24 data streams when a large quantity of antennas are configured, thereby greatly improving a throughput of a MIMO system. In addition, the solution of the present invention can be compatible with a DMRS mapping solution for Ranks 1-8 in an existing standard in a phase inversion manner, so as to implement switch of any layer and a smooth low-order rollback, thereby reducing overheads and complexity of system design.

It may be clearly understood by a person skilled in the art that, for a purpose of convenient and brief description, only the foregoing functional module division is used as an example for description. In an actual application, the foregoing functions are assigned to different functional modules for implementation as required, that is, an inner structure of the apparatus is divided into different functional modules to implement all or some of the functions described above. For a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one process unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor (processor) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A base station, comprising:
a configuration unit, configured to determine, according to network configuration information, that a quantity of demodulation reference signal (DMRS) layers of user equipment (UE) is N, wherein N is a positive integer less than or equal to 24; and
a processing unit, configured to:
if 8<N≤12, map N DMRS ports corresponding to the quantity of DMRS layers onto three code division multiplexing (CDM) groups on a resource block (RB), wherein the RB is one of a plurality of RBs of a physical downlink shared channel (PDSCH); or
if 12<N≤24, map N DMRS ports corresponding to the quantity of DMRS layers onto six CDM groups on an RB; or
if N≤8, map N DMRS ports corresponding to the quantity of DMRS layers onto two CDM groups on an RB,
separately map the N DMRS ports on the RB to K symbols corresponding to the N DMRS ports in a time domain,
separately map the N DMRS ports on the RB to J subcarriers corresponding to the DMRS ports in a frequency domain, wherein 1≤K≤4, and 1≤J≤6, wherein the RB comprises 12 subcarriers in the frequency domain and 14 symbols in the time domain, and wherein the J subcarriers include a first subcarrier, a second subcarrier, a sixth subcarrier, a seventh subcarrier, an eleventh subcarrier, and a twelfth subcarrier in 12 subcarriers,
if 8<N≤12, the first subcarrier and the seventh subcarrier are associated with a first CDM group, the second subcarrier and the eleventh subcarrier are associated with a second CDM group, and the sixth subcarrier and the twelfth subcarrier are associated with a third CDM group, or
if 12<N≤24, the first subcarrier is associated with the first CDM group, the seventh subcarrier is associated with the second CDM group, the second subcarrier is associated with the third CDM group, the eleventh subcarrier is associated with the fourth CDM group, the sixth subcarrier is associated with a fifth CDM group, and the twelfth subcarrier is associated with a sixth CDM group, or
if N≤8, the first subcarrier, the sixth subcarrier, and the eleventh subcarrier are associated with the first CDM group, and the second subcarrier, the seventh subcarrier, and the twelfth subcarrier are associated with the second CDM group.

2. The base station according to claim 1, wherein the base station further comprises:
a multiplexing unit, configured to perform code division multiplexing (CDM) on K symbols of the RB in a time domain; and perform frequency division multiplexing (FDM) on J subcarriers of the RB in a frequency domain.

3. The base station according to claim 2, wherein the base station further comprises:
a precoding unit, configured to perform a precoding operation on the PDSCH channel to generate a DMRS signal.

4. A resource allocation method, comprising:
determining, according to network configuration information, that a quantity of demodulation reference signal (DMRS) layers of user equipment (UE) is N, wherein N is a positive integer less than or equal to 24; and
if $8<N\le 12$, mapping N DMRS ports corresponding to the quantity of DMRS layers onto three code division multiplexing (CDM) groups on a resource block (RB), wherein the RB is one of a plurality of RBs of a physical downlink shared channel PDSCH; or if $12<N\le 24$, mapping the N DMRS ports corresponding to the quantity of DMRS layers onto six CDM groups on an RB; or if $N\le 8$, mapping the N DMRS ports corresponding to the quantity of DMRS layers onto two CDM groups on an RB, wherein the method for mapping the N DMRS ports onto the three CDM groups/the two CDM groups/the six CDM groups comprises:
separately mapping the N DMRS ports on the RB to K symbols corresponding to the DMRS ports in a time domain, and
separately mapping the N DMRS ports on the RB to J subcarriers corresponding to the N DMRS ports in a frequency domain, wherein $1\le K\le 4$, and $1\le J\le 6$, wherein the RB comprises 12 subcarriers in the frequency domain and 14 symbols in the time domain, and the J subcarriers include a first subcarrier, a second subcarrier, a sixth subcarrier, a seventh subcarrier, a eleventh subcarrier, and a twelfth subcarrier in 12 subcarriers,
wherein if $8<N\le 12$, the first subcarrier and the seventh subcarrier are associated with a first CDM group, the second subcarrier and the eleventh subcarrier are associated with a second CDM group, and the sixth subcarrier and the twelfth subcarrier are associated with a third CDM group,
wherein if $12<N\le 24$, the first subcarrier is associated with the first CDM group, the seventh subcarrier is associated with the second CDM group, the second subcarrier is associated with the third CDM group, the eleventh subcarrier is associated with the fourth CDM group, the sixth subcarrier is associated with a fifth CDM group, and the twelfth subcarrier is associated with a sixth CDM group, and
wherein if $N\le 8$, the first subcarrier, the sixth subcarrier, and the eleventh subcarrier are associated with the first CDM group, and the second subcarrier, the seventh subcarrier, and the twelfth subcarrier are associated with the second CDM group.

5. The method according to claim 4, wherein after mapping the N DMRS ports onto the three CDM groups/the two CDM groups/the sixth CDM groups, the method further comprises:
performing code division multiplexing (CDM) on K symbols of the RB in a time domain; and
performing frequency division multiplexing (FDM) on the J subcarriers of the RB in a frequency domain.

6. The method according to claim 5, wherein after performing FDM on the J subcarriers of the RB, the method further comprises:
performing a precoding operation on the PDSCH channel to generate a DMRS signal.

7. A non-transitory computer readable storage medium having instructions stored therein, which when executed by a processor, cause the processor to perform a method of resource allocation, the method comprising:
determining, according to network configuration information, that a quantity of demodulation reference signal (DMRS) layers of user equipment (UE) is N, wherein N is a positive integer less than or equal to 24; and
if $8<N\le 12$, mapping N DMRS ports corresponding to the quantity of DMRS layers onto three code division multiplexing (CDM) groups on a resource block (RB), wherein the RB is one of a plurality of RBs of a physical downlink shared channel PDSCH; or if $12<N\le 24$, mapping the N DMRS ports corresponding to the quantity of DMRS layers onto six CDM groups on an RB; or if $N\le 8$, mapping the N DMRS ports corresponding to the quantity of DMRS layers onto two CDM groups on an RB, wherein mapping the N DMRS ports onto the three CDM groups/the two CDM groups/ the six CDM groups comprises:
separately mapping the N DMRS ports on the RB to K symbols corresponding to the DMRS ports in a time domain,
separately mapping the N DMRS ports on the RB to J subcarriers corresponding to the N DMRS ports in a frequency domain, wherein $1\le K\le 4$, and $1\le J\le 6$, wherein the RB comprises 12 subcarriers in the frequency domain and 14 symbols in the time domain, and the J subcarriers include a first subcarrier, a second subcarrier, a sixth subcarrier, a seventh subcarrier, a eleventh subcarrier, and a twelfth subcarrier in 12 subcarriers,
wherein if $8<N\le 12$, the first subcarrier and the seventh subcarrier are associated with a first CDM group, the second subcarrier and the eleventh subcarrier are associated with a second CDM group, and the sixth subcarrier and the twelfth subcarrier are associated with a third CDM group,
wherein if $12<N\le 24$, the first subcarrier is associated with the first CDM group, the seventh subcarrier is associated with the second CDM group, the second subcarrier is associated with the third CDM group, the eleventh subcarrier is associated with the fourth CDM group, the sixth subcarrier is associated with a fifth CDM group, and the twelfth subcarrier is associated with a sixth CDM group, and
wherein if $N\le 8$, the first subcarrier, the sixth subcarrier, and the eleventh subcarrier are associated with the first CDM group, and the second subcarrier, the seventh subcarrier, and the twelfth subcarrier are associated with the second CDM group.

8. The computer readable storage medium according to claim 7, wherein after mapping the N DMRS ports onto the three CDM groups/the two CDM groups/the sixth CDM groups, the method further comprises:
performing code division multiplexing (CDM) on K symbols of the RB in a time domain; and
performing frequency division multiplexing (FDM) on the J subcarriers of the RB in a frequency domain.

9. The computer readable storage medium according to claim 8, wherein after performing FDM on the J subcarriers of the RB, the method further comprises:
  performing a precoding operation on the PDSCH channel to generate a DMRS signal.

\* \* \* \* \*